United States Patent
Mackin

(10) Patent No.: US 10,737,792 B2
(45) Date of Patent: Aug. 11, 2020

(54) TURBOFAN ENGINE FLUID ICE PROTECTION DELIVERY SYSTEM

(71) Applicant: The Boeing Company, Chicago, IL (US)

(72) Inventor: Steve G. Mackin, Bellevue, WA (US)

(73) Assignee: The Boeing Company, Chicago, IL (US)

(*) Notice: Subject to any disclaimer, the term of this patent is extended or adjusted under 35 U.S.C. 154(b) by 475 days.

(21) Appl. No.: 15/639,878

(22) Filed: Jun. 30, 2017

(65) Prior Publication Data

US 2018/0079511 A1 Mar. 22, 2018

Related U.S. Application Data

(60) Provisional application No. 62/398,343, filed on Sep. 22, 2016.

(51) Int. Cl.
| | |
|---|---|
| *B64D 15/08* | (2006.01) |
| *F04F 5/20* | (2006.01) |
| *B64D 33/02* | (2006.01) |
| *B64C 3/00* | (2006.01) |
| *B64C 5/02* | (2006.01) |
| *F04F 5/24* | (2006.01) |

(52) U.S. Cl.
CPC .............. *B64D 15/08* (2013.01); *B64C 3/00* (2013.01); *B64C 5/02* (2013.01); *B64D 33/02* (2013.01); *F04F 5/20* (2013.01); *F04F 5/24* (2013.01); *B64D 2033/0233* (2013.01)

(58) Field of Classification Search
CPC ........ B64D 15/00; B64D 15/02; B64D 15/04; B64D 15/06; B64D 15/08; B64D 15/10; B64D 2033/0233
See application file for complete search history.

(56) References Cited

U.S. PATENT DOCUMENTS

| | | | |
|---|---|---|---|
| 5,454,532 A * | 10/1995 | Whitmire | F04F 5/46 244/134 B |
| 5,523,959 A | 6/1996 | Seegmiller | |
| 5,589,822 A | 12/1996 | Stern | |
| 5,617,076 A | 4/1997 | Stern | |
| 5,760,711 A | 6/1998 | Burns | |
| 5,838,239 A | 11/1998 | Stern et al. | |
| 5,921,501 A | 7/1999 | Pernick | |

(Continued)

FOREIGN PATENT DOCUMENTS

| | | |
|---|---|---|
| GB | 2130158 | 5/1984 |
| WO | 99/16034 | 4/1999 |
| WO | 9916034 | 4/1999 |

OTHER PUBLICATIONS

Extended European Search Report dated Feb. 2, 2018 for EP application No. 17184132.3.

(Continued)

*Primary Examiner* — Brian M O'Hara
(74) *Attorney, Agent, or Firm* — Gates & Cooper LLP

(57) ABSTRACT

Method and system to deliver anti-ice fluid to an ice prone surface using a pressurized tank pressurized with engine bleed air. The method and system further uses an eductor to evacuate anti-ice fluid such that the anti-ice fluid's unwanted leakage is eliminated or reduced. The method and system further measures a flow rate of anti-ice fluid using a positive displacement fluid meter.

20 Claims, 14 Drawing Sheets

(56) References Cited

U.S. PATENT DOCUMENTS

| | | | |
|---|---|---|---|
| 6,010,095 | A | 1/2000 | Hackmeister |
| 6,052,056 | A | 4/2000 | Burns et al. |
| 6,207,940 | B1 | 3/2001 | Feher et al. |
| 6,286,370 | B1 | 9/2001 | Sinha |
| 6,371,411 | B1 | 4/2002 | Breer et al. |
| 6,457,676 | B1 | 10/2002 | Breer et al. |
| 6,642,490 | B2 | 11/2003 | Feher |
| 6,688,558 | B2 | 2/2004 | Breer et al. |
| 6,819,265 | B2 | 11/2004 | Jamieson et al. |
| 7,370,525 | B1 | 5/2008 | Zhao et al. |
| 7,439,877 | B1 | 10/2008 | Jarvinen |
| 7,933,002 | B2 | 4/2011 | Halldorsson |
| 8,325,338 | B1 | 12/2012 | Pope et al. |
| 8,462,354 | B2 | 6/2013 | Barnes |
| 8,517,601 | B2 | 8/2013 | Stothers et al. |
| 8,967,543 | B2 * | 3/2015 | Saito ............... F01D 25/02 244/134 B |
| 9,242,735 | B1 | 1/2016 | Meis et al. |
| 9,429,680 | B2 | 8/2016 | Grzych et al. |
| 9,469,408 | B1 | 10/2016 | Elangovan et al. |
| 9,546,004 | B1 | 1/2017 | Safai et al. |
| 9,676,485 | B2 | 6/2017 | Stothers et al. |
| 9,696,238 | B2 | 7/2017 | Bosetti et al. |
| 9,776,731 | B1 | 10/2017 | Lieberman et al. |
| 10,260,371 | B2 * | 4/2019 | Youssef ............... B64D 15/04 |
| 2004/0036630 | A1 | 2/2004 | Jamieson et al. |
| 2005/0087720 | A1 | 4/2005 | Samuels et al. |
| 2005/0263646 | A1 | 12/2005 | Nichols |
| 2006/0097111 | A1 * | 5/2006 | Wood ............... B64C 1/1476 244/134 C |
| 2010/0328644 | A1 | 12/2010 | Lu et al. |
| 2012/0274938 | A1 | 11/2012 | Ray |
| 2013/0113926 | A1 | 5/2013 | Chen et al. |
| 2013/0320145 | A1 | 12/2013 | McGillis et al. |
| 2014/0055611 | A1 | 2/2014 | Wong et al. |
| 2014/0117106 | A1 | 5/2014 | Acheson et al. |
| 2015/0108233 | A1 | 4/2015 | Wright |
| 2015/0260099 | A1 | 9/2015 | Gally et al. |
| 2016/0311542 | A1 | 10/2016 | Mackin |
| 2016/0356180 | A1 | 12/2016 | Bol |
| 2017/0008635 | A1 | 1/2017 | Mackin et al. |
| 2017/0057618 | A1 | 3/2017 | Khozikov et al. |
| 2017/0057644 | A1 | 3/2017 | Khozikov et al. |
| 2017/0158336 | A1 | 6/2017 | Meis et al. |
| 2017/0166314 | A1 | 6/2017 | Meis et al. |
| 2017/0166777 | A1 | 6/2017 | Berry et al. |
| 2017/0190431 | A1 | 7/2017 | Dichek et al. |
| 2017/0204291 | A1 | 7/2017 | Berry et al. |
| 2017/0210478 | A1 | 7/2017 | Mackin |
| 2017/0233106 | A1 | 8/2017 | Svanebjerg et al. |
| 2017/0283078 | A1 | 10/2017 | Loussides et al. |
| 2017/0313428 | A1 | 11/2017 | Mackin et al. |
| 2018/0079511 | A1 | 3/2018 | Mackin |
| 2018/0079512 | A1 | 3/2018 | Jackowski et al. |

OTHER PUBLICATIONS

European Application Serial No. 17184132, European Search Report dated Feb. 2, 2018.

* cited by examiner

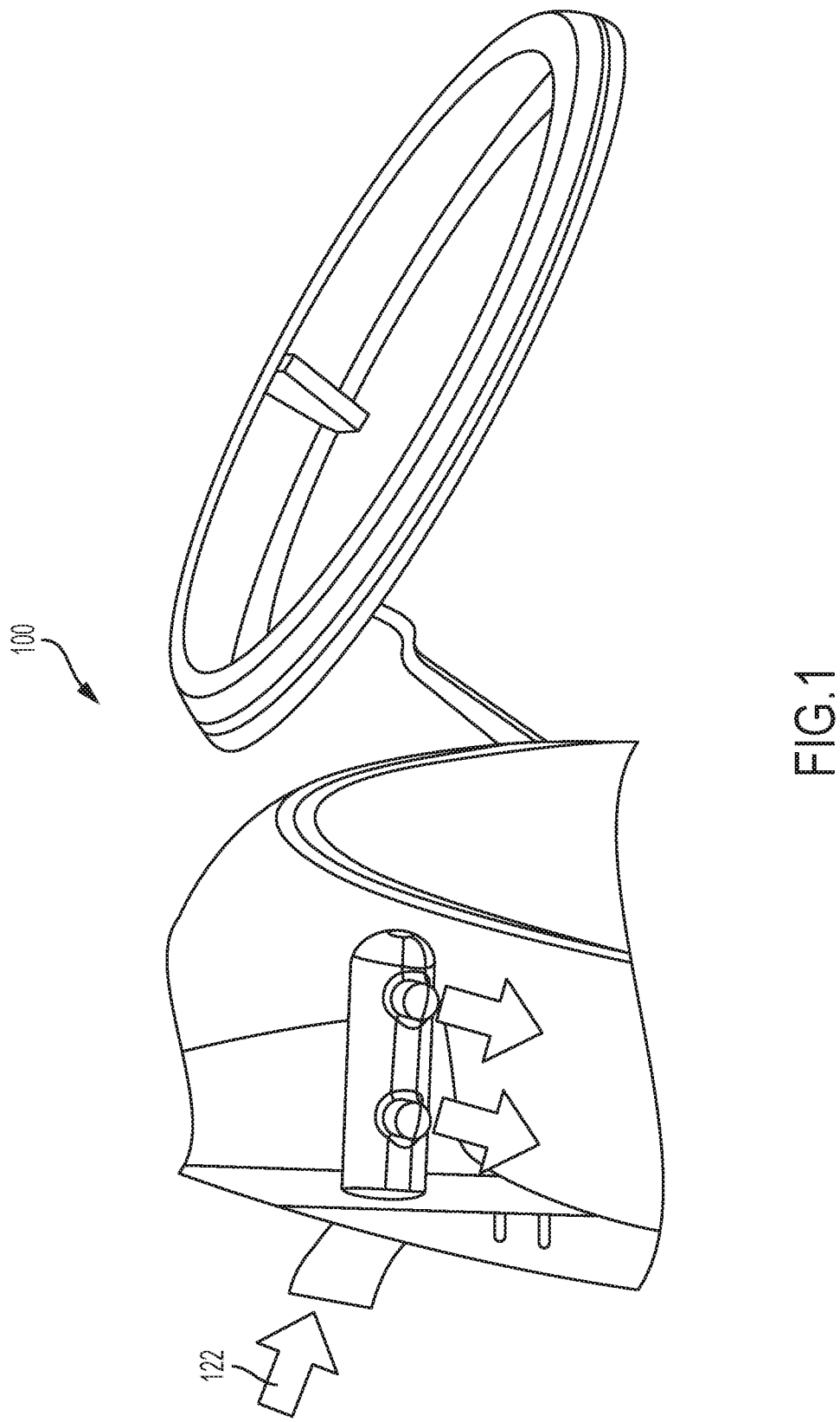

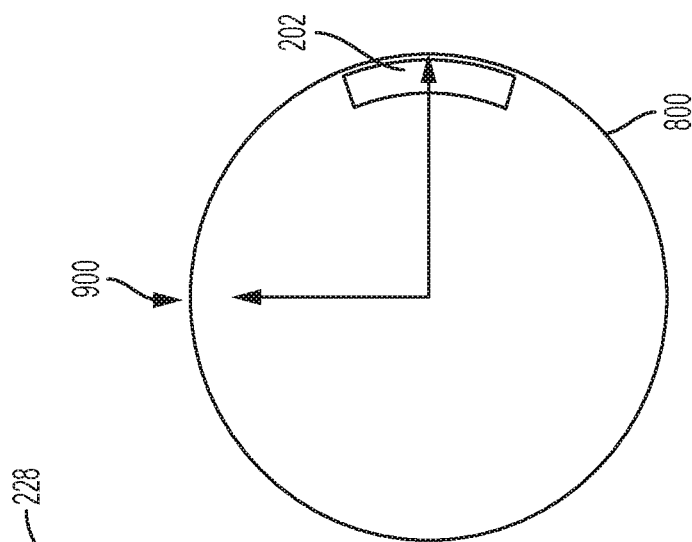
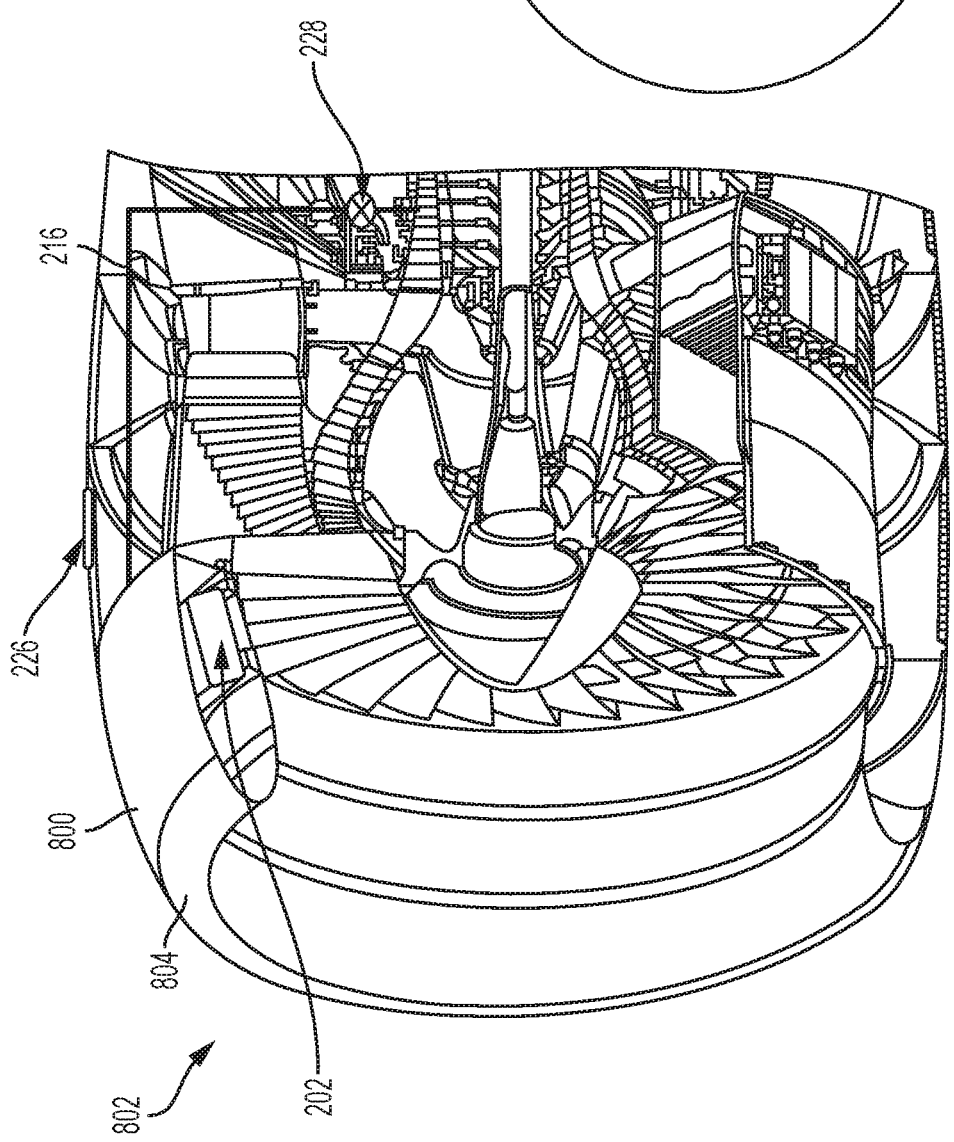
FIG. 8
FIG. 9

TURBOFAN ENGINE FLUID ICE PROTECTION DELIVERY SYSTEM

CROSS REFERENCE TO RELATED APPLICATIONS

This application claims the benefit under 35 U.S.C. Section 119(e) of commonly-assigned U.S. Provisional Patent Application No. 62/398,343, filed Sep. 22, 2016, by Steve G. Mackin, entitled "TURBOFAN ENGINE FLUID ICE PROTECTION DELIVERY SYSTEM," which application is incorporated by reference herein.

BACKGROUND

The present disclosure relates to anti-ice systems, and more specifically, to a system for delivering ice protection or anti-ice fluid in an anti-ice system.

Ice buildup on aerodynamic surfaces of aircraft can be problematic. For example, ice can build up on the leading edges of wings and/or engine nacelles. The ice can also disrupt the intended airflow over the aerodynamic surfaces, causing a loss of lift generated by the aerodynamic surface. A combination of design considerations of modern airfoils and modern certification requirements result in less ice tolerance, meaning that modern aircraft need to have more anti-ice capability than some conventional anti-icing technologies can provide. However, existing anti-ice technologies are complicated and/or expensive.

Civil aviation aircraft utilize fluid ice protection systems to anti-ice wing leading edges, windshields, and propellers. Generally, aircraft with on-board anti-ice or de-ice capability use systems selected from bleed air systems, Tecalemit-Kilfrost-Sheepbridge (TKS) systems or Freezing Point Depressant (FPD) systems, and pneumatic/mechanical boots.

FIG. 1 illustrates a bleed air system 100 wherein ice protection is provided by a pneumatic swirl system utilizing hot bleed air inputted 102 into the engine inlet from the engine core. A small percentage of the core mass flow is extracted between compressor stages, and transferred to a 'D-duct' formed by the inner surface of the nacelle lip and the upstream surface of the forward bulk-head as shown in FIG. 1. Such systems provide ice protection via thermal flux through the nacelle lipskin and are about 50% efficient, with roughly half of the energy in the high pressure, high temperature bleed air transferred through the metallic lip and about half remaining in the overboard exhaust.

However, the bleed air system has a number of limitations. Firstly, the inlet structure must accommodate high internal temperatures and pressures, which are exacerbated by a variety of failure modes and dispatch considerations. Secondly, the engine idle power setting must be increased when the engine anti-ice (EAI) system is operating, so that bleed flow extraction does not exceed engine capability in this condition. Thirdly, because the power setting must increase when the EAI is on, the maximum thrust available when the EAI system is operating is decreased. Finally, Specific Fuel Consumption (SFC) also increases when the EAI system is operating. Though this has only a small impact on block fuel usage for most missions, it becomes significant when the effect on engine-out conditions analyzed as part of conformance with Extended-range Twin-engine Operational Performance Standards (ETOPS) is considered. Ultimately the SFC increase due to EAI increases the required fuel reserve and impacts take-off weight for every mission. For Ultra High Bypass (UHB) engines with large fan diameters and smaller cores, these issues are magnified. In fact, the reduction in maximum thrust available due to the EAI system may ultimately impact UHB engine core size and result in weight and SFC penalties.

Consequently, FPD systems are considered the most efficient, using a glycol-based fluid that is swept onto the leading edge of an airfoil, an engine nacelle, and/or a spinner for a propeller or fan from a porous panel. The FPD system utilizes Direct Current (DC) motor driven pumps to deliver the anti-icing fluid to the relevant surfaces. The pumps extract fluid from an unpressurized reservoir and boost it to approximately 100 psia. The glycol-based fluid mixes with water droplets, lowering the freezing point of the water droplets so that the water droplets cannot freeze. The mixture of glycol-based fluid and water droplets then flow off the aircraft together.

However, DC pumps have a number of drawbacks. Firstly, while the DC pump reliability is acceptable for civil aircraft operations, a DC pump will likely will not be installed in a friendly environment on a commercial aircraft. For example, low vibration areas will get too cold and high vibration areas may be too hot for proper operation of the DC pump.

In addition, the porous panels in FPD systems leak fluid when not in use and/or when the ambient temperature changes. Warm temperatures reduce the viscosity of the anti-icing fluid causing the anti-icing fluid to leak out of the porous panels. In commercial engines leaking fluid is not acceptable due to foot traffic around the engine while in tarmac.

Moreover, the flight envelope of commercial aircraft may exacerbate leakage. As a result, FPD system components may not be robust enough to certify for commercial aircraft because the system Mean Time Between Failures (MTBF) is not high enough.

What is needed, then, is a solution that reduces power requirements of anti-ice systems, improves delivery of anti-icing fluid, mitigates leakage of the anti-icing fluid, and increases robustness of anti-ice systems using anti-ice fluid. The present disclosure satisfies these needs.

SUMMARY

To overcome the limitations described above, and to overcome other limitations that will become apparent upon reading and understanding the present disclosure, the present disclosure describes a method of pumping anti-ice fluid in an anti-ice system using engine bleed air.

In various embodiments, the method includes pressurizing a tank containing anti-ice fluid using engine bleed air; and delivering the anti-ice fluid from the tank to a porous panel under pressure from the engine bleed air. The porous panel is on an aerodynamic surface and/or ice prone surface of the aircraft and the anti-ice fluid flows from the porous panel to prevent and remove ice-build up on the aerodynamic surface and/or ice prone surface. Examples of the aerodynamic surface and/or ice prone surface, include but are not limited to, a wing, a tail, and an engine inlet.

In various examples, the method includes using an eductor to evacuate anti-ice fluid from the porous panel after landing and in non-icing conditions such that the anti-ice fluid's leakage from the porous panel is eliminated or reduced. In various examples, the eductor pulls a vacuum on a tank using engine bleed air and the vacuum draws the anti-ice fluid into the tank from the porous panel. In various examples, the method includes flowing engine bleed air through the eductor, wherein the flowing creates a drop in pressure suctioning the anti-ice fluid from the porous panel and into a tank.

In various examples, the flow rate of the anti-ice fluid is measured using a positive displacement fluid meter.

In various examples, the method includes varying the pressure in the tank (e.g., varying the flow rate of the engine bleed air into the tank) to vary the flow rate of the anti-ice fluid into the porous panel. In various examples, varying the flow rate of the engine bleed air is achieved using a Pressure Regulating Shut Off Valve (PRSOV). In various examples, the PRSOV's valve leakage is vented through an eductor.

In various examples, the flow rate of the anti-ice fluid charges the porous panel with the anti-ice fluid after starting the aircraft's engine.

In various examples, the flow rate of the anti-ice fluid is controlled so that the anti-ice fluid flows out of pores in the porous panel and onto the aerodynamic surface, the anti-ice fluid removing and preventing the ice build-up on the aerodynamic surface.

In various examples, a Fluid Ice Protection System (FIPS) is provided, including a tank containing anti-ice fluid, the tank attached to an aircraft component; a porous panel on an aerodynamic surface of the aircraft component; and a conduit. The conduit delivers ant-ice fluid from the tank to the porous panel under pressure from the engine bleed air when the tank is pressurized by the engine bleed air. The conduit extracts the anti-ice fluid from the porous panel into the tank under suctioning from an eductor when the eductor is connected to the tank and the engine bleed air flows through the eductor.

In various examples, the FIPS includes a first solenoid valve switching the flow of the engine bleed air between the tank and the eductor; a second solenoid valve regulating the flow rate of the anti-ice fluid between the tank and the eductor; and a third solenoid valve regulating the flow rate of the anti-ice fluid between the tank and the porous panel.

BRIEF DESCRIPTION OF THE SEVERAL VIEWS OF THE DRAWINGS

Referring now to the drawings in which like reference numbers represent corresponding parts throughout:

FIG. 1 is an illustration of anti-ice bleed air systems using thermal energy from the bleed air to melt ice on the engine.

FIG. 8 is an illustration of installation location and integration of FIPS on an engine inlet, according to various examples.

FIG. 9 illustrates the position of the tank looking aft at the engine inlet, according to various examples.

DETAILED DESCRIPTION

In the following, reference is made to particular aspects or examples presented in this disclosure. However, the scope of the present disclosure is not limited to specific described aspects or examples. Instead, any combination of the following features and elements, whether related to different aspects/examples or not, is contemplated to implement and practice contemplated aspects. Furthermore, although aspects and examples disclosed herein may achieve advantages over other possible solutions or over the prior art, whether or not a particular advantage is achieved by a given aspect or example is not limiting of the scope of the present disclosure. Thus, the following aspects, examples, features, and advantages are merely illustrative and are not considered elements or limitations of the appended claims except where explicitly recited in a claim(s).

The present disclosure describes at fluid ice protection delivery system using engine bleed air from an aircraft engine.

As used herein, anti-ice fluid, anti-icing fluid, ice protection fluid, or anti-freeze are used interchangeably, and refer to fluid delivered by an anti-icing or anti-ice system to prevent the accumulation of ice. Examples of anti-ice fluid include, but are not limited to, fluid that mixes with water, lowering the freezing point of the water so that the water cannot freeze. An example of an anti-ice fluid includes, but is not limited to, glycol-based fluid.

As used herein, an anti-ice or anti-icing system is a system to prevent the accumulation of ice.

Fluid Ice Protection System (FIPS)

Figure 2A:
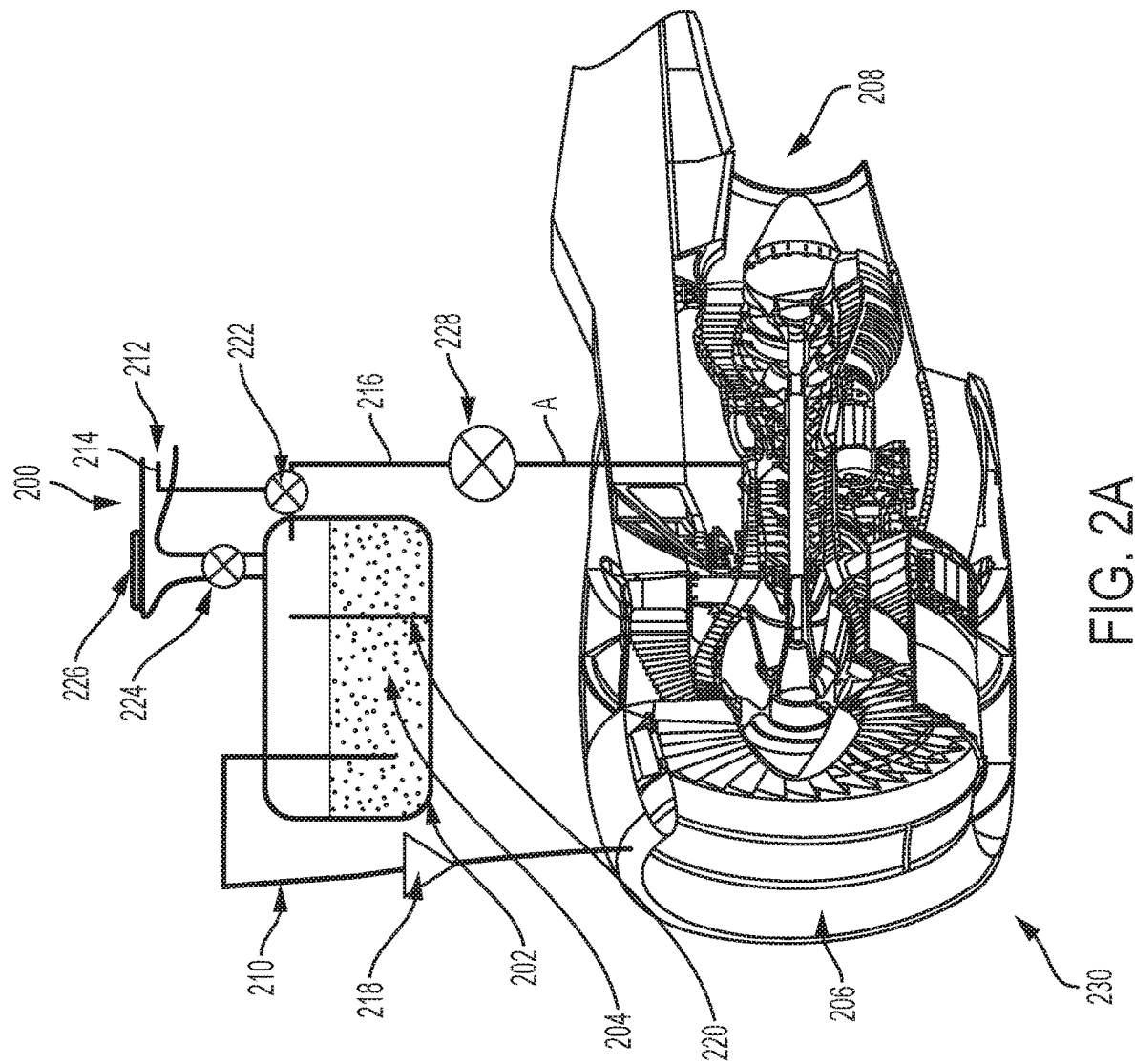
FIG. 2A is an illustration of a Fluid Ice Protection System (FIPS) according to various examples.

FIG. 2A illustrates a FIPS 200 including a tank 202 containing ice protection fluid 204; a porous panel 206 including a porous lip skin of an engine inlet on a turbofan engine 208; a conduit 210, such as a fluid pick up line; and an eductor 212.

In various examples, the porous lipskin comprises a porous membrane.

The conduit 210 connected to the tank 202 delivers the ice protection fluid 204 from the tank 202 to the porous panel 206 under pressure from engine bleed air A when the tank 202 is pressurized by the engine bleed air. In one instance, the tank 202 is a pressurized composite tank. The conduit 210 extracts the ice protection fluid 204 from the porous panel 206 into the tank 202 under suctioning from the eductor 212 when the eductor 212 is connected to the tank 202 and the engine bleed air flows through a nozzle 214 (e.g., the bleed air flows supersonically through the nozzle) in the eductor 212. In various examples, the conduit 210 is a plastic tube.

The system further includes a second conduit 216 delivering the engine bleed air from the high pressure compressor in the engine 208. In various examples, the engine bleed air is obtained from a bleed air system such a manifold. In various examples, the second conduit 216 is a stainless steel pipe. In various examples, the stainless steel pipe has a ⅜ inch diameter.

The system further includes a flow meter 218 (measuring flow rate of the ice protection fluid 204 in the conduit 210) and a fluid level sensor 220. In one example, the flow meter 218 is a displacement flow meter. In various examples, the ice protection fluid flows to the porous panel in the conduit comprising multiple fluid pick up lines and multiple flow meters.

The system further includes a first valve 222 switching the flow of the engine bleed air between the tank 202 and the eductor 212 and a second valve 224 regulating the flow of the ice protection fluid between the tank 202 and the eductor 212. In one instance, the valves 222-224 are solenoid valves. In another instance, the first valve 222 is a three way two position solenoid (SOL) valve as illustrated in FIG. 2B and the second valve 224 is a solenoid on/off valve.

Figure 2C:
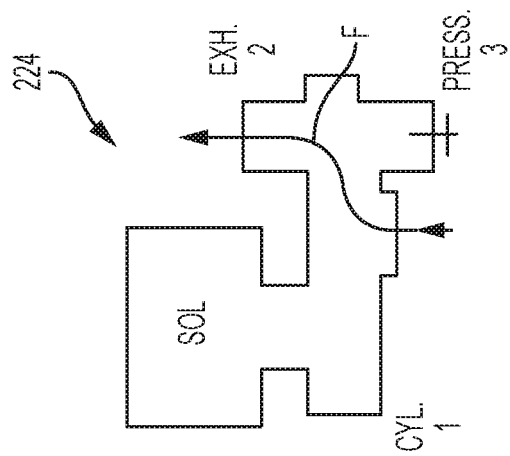
FIGS. 2B and 2C are illustrations of a three way two position solenoid used in the FIPS according to various examples.
Figure 2B:
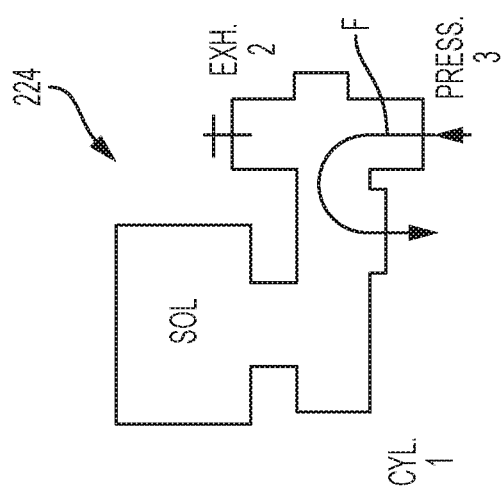

FIGS. 2B-2C illustrate operation of an example normally open solenoid on/off valve 224. FIG. 2B shows that when the solenoid (Sol) is de-energized, pressure (press) from the engine bleed air allows the engine bleed air to flow F through the valve cylinder (cyl) to the first valve 722. FIG. 2C shows that when the solenoid (Sol) is energized, pressure (press) from the engine bleed air is blocked and cannot enter the valve cylinder (cyl) and flow F in the second conduit 716 is connected to an exhaust (exh).

Ice protection fluid 204 is replenished through a fill cap 226 on the eductor 212.

The system further includes a third valve 228 regulating the flow of the engine bleed air into the tank. In one example, the valve is a pressure regulating shut off valve (PRSOV).

Filling the Tank

Figure 3:
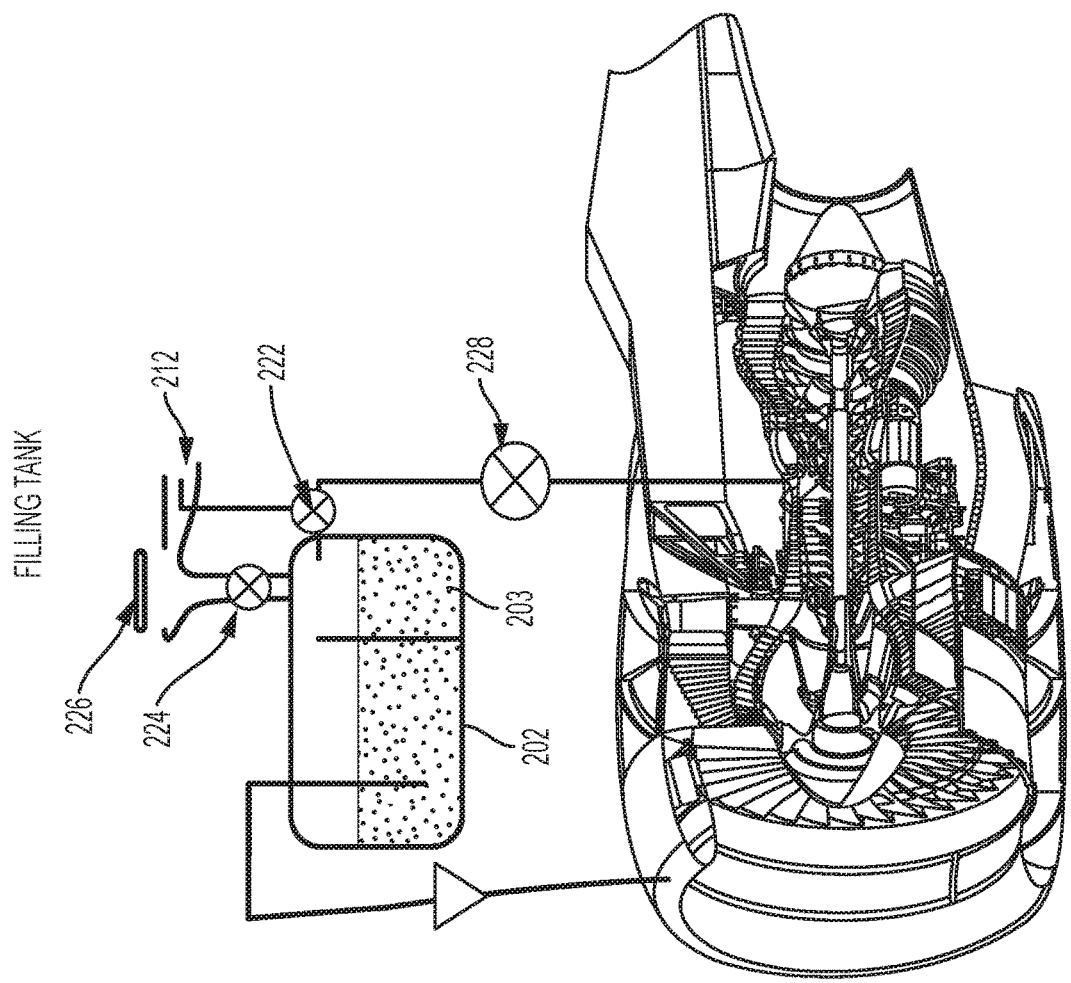
FIG. 3 is an illustration of filling the tank of the FIPS according to various examples.

FIG. 3 illustrates the FIPS operating to fill the tank 202 with anti-ice fluid 204. The fill cap 226 is off, the second valve 224 is open, the third valve 228 is closed (closing off the engine bleed air, engine 208 off), and the first valve 222 is switched to open the second conduit to the eductor. Anti-ice fluid 204 is poured into the tank through the second valve. The eductor 212 is off.

Charging Panels

Figure 4:
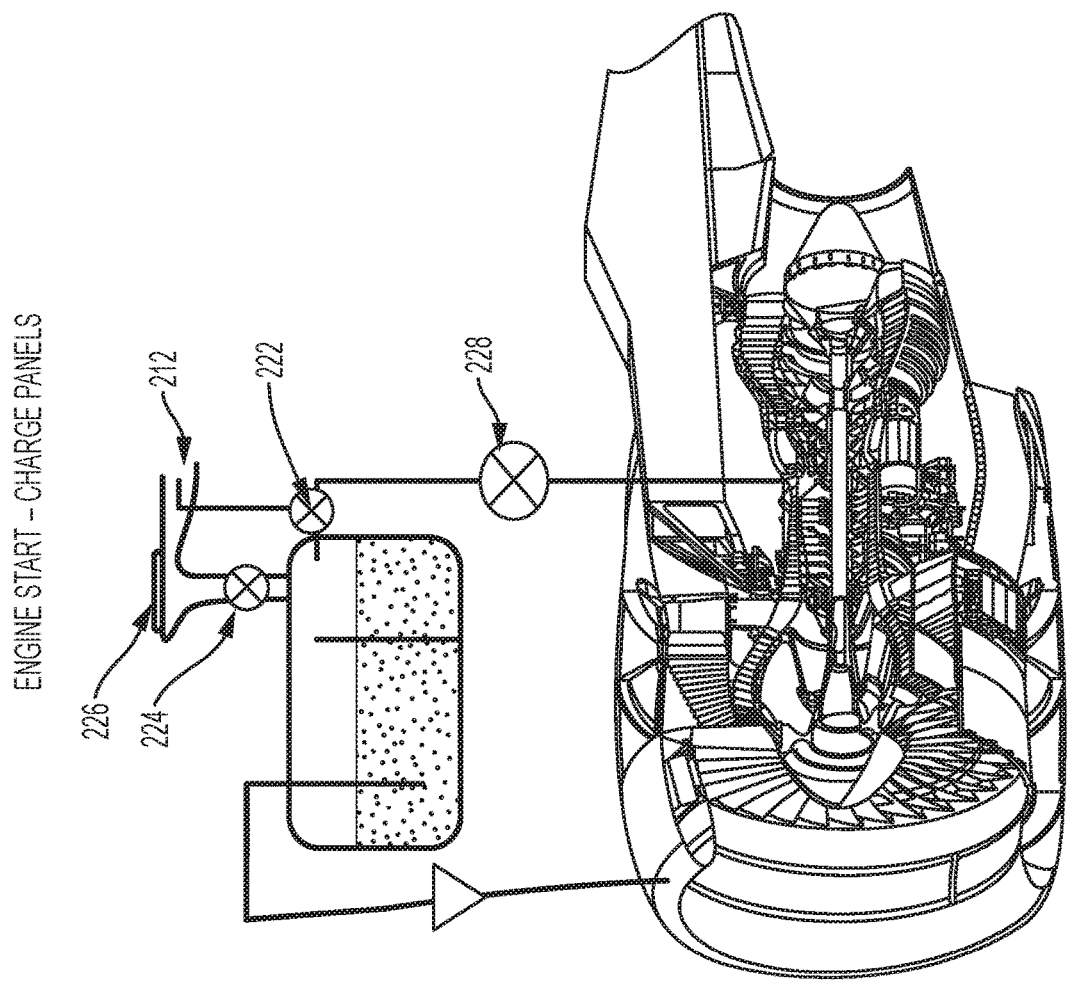
FIG. 4 is an illustration of charging the panels of the FIPS according to various examples.

FIG. 4 illustrates the FIPS operating to charge the porous panels after starting the engine. The system is run in this mode until the porous panel 206 in the engine lip is charged. The fill cap 226 is closed, the second valve 224 is closed, the third valve 228 is open (regulating the flow of engine bleed air during engine 208 starting), and the first valve 222 is switched to open the second conduit 216 to pressurize the tank with the engine bleed air. The second conduit 216 delivers the engine bleed air from the high pressure compressor in the engine 208 to pressurize the tank and the conduit 210 delivers the ice protection fluid 204 from the tank 202 to the porous panel 206 under pressure from the engine bleed air. The eductor 212 is off.

Operation in Non-Icing Conditions

Figure 5:
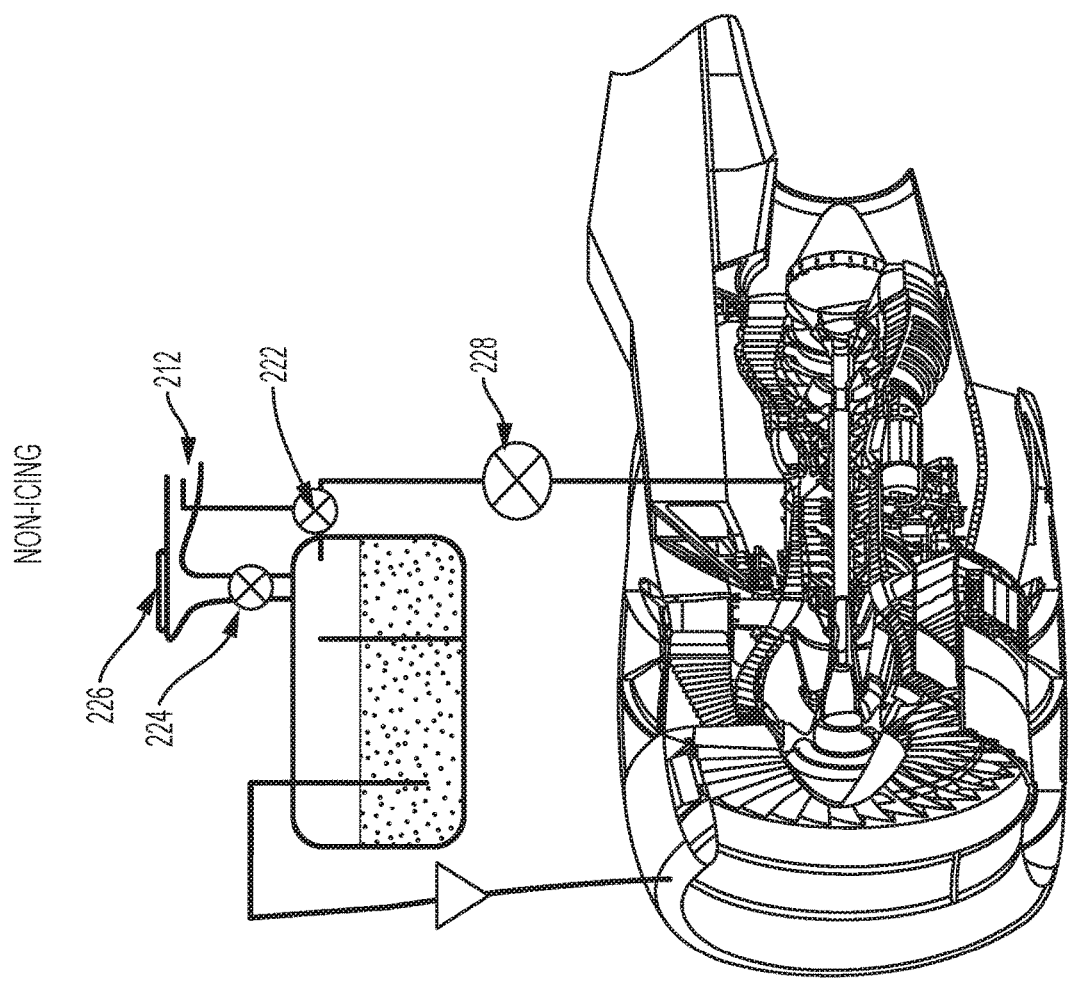
FIG. 5 is an illustration of the operation of the FIPS during non-icing conditions, according to various examples.

FIG. 5 illustrates the FIPS operating in a non-icing condition. The fill cap 226 is closed, the second valve 224 is closed, the third valve 226 is closed (closing off the engine bleed air while the engine is running), and the first valve 222 is switched to open the second conduit to the eductor. The eductor 212 vents leakage in the third valve 228.

Operation in Icing Condition

Figure 6:
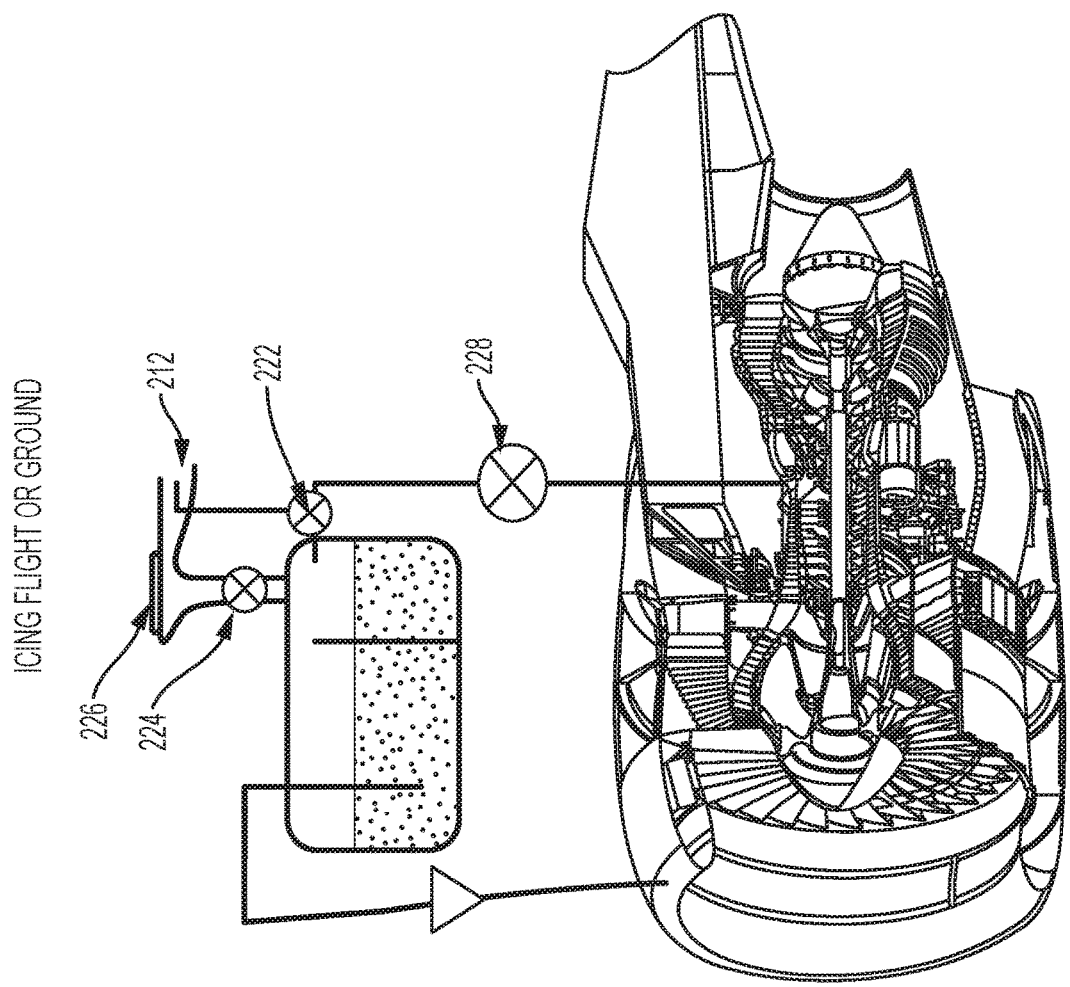
FIG. 6 is an illustration of the operation of the FIPS during icing conditions, according to various examples.

FIG. 6 illustrates the FIPS operating in an icing condition during flight or on the ground. The fill cap 226 is closed, the second valve 224 is closed, the third valve 228 is open (regulating the flow of engine bleed air to achieve fluid flow rate while the engine 208 is running), and the first valve 222 is switched to open the second conduit to pressurize the tank with the engine bleed air. The conduit 210 delivers the ice protection fluid from the tank to the porous panel under pressure from the engine bleed air. The eductor 212 is off. Ice protection fluid 204 is flowing to the lip 206 through one or more pick up lines 210 and one or more flow meters 218.

Operation in Non-Icing Condition after Landing

Figure 7:
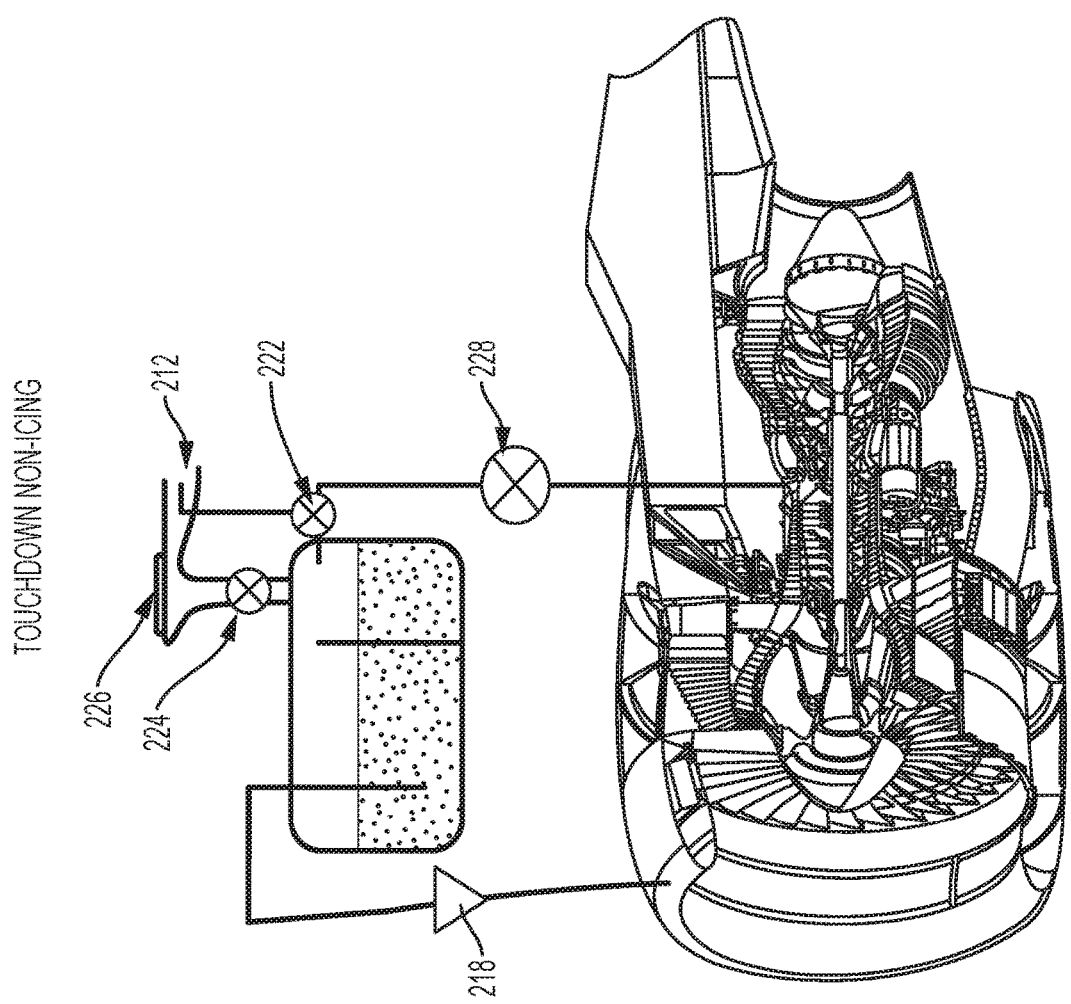
FIG. 7 is an illustration of the operation of the FIPS during non-icing conditions after landing, according to various examples.

FIG. 7 illustrates the FIPS operating after touch down in a non-icing condition. The fill cap 226 is closed, the second valve 224 is open, the third 228 valve is open (regulating the engine bleed air to choke the eductor), and the first valve 222 is switched to open the second conduit 216 to the eductor. The conduit 210 extracts the ice protection fluid from the porous panel into the tank 202 under suctioning from the eductor 212 (eductor 212 on). The system is run in this mode until the fluid flow meter 218 stops indicating flow.

FIPS Engine Inlet Integration

FIG. 8 shows the integration of a FIPS with the engine inlet lip 800 defining a leading edge 802 of a nacelle 804 of an aircraft engine 208. The anti-ice fluid 204 is pumped into the leading edge cavity comprising tank 202 (e.g., pressurized composite tank 202) and secreted through a porous panel comprising a porous metallic lipskin 800. The action of the freestream airflow causes the fluid 204 to run back on both the internal and external surfaces of the inlet, protecting the full leading edge and preventing the formation of run back ice. FIG. 9 illustrates the position of the tank looking aft at the engine inlet, wherein the tank is positioned at 90 degrees from the top 900 of the engine inlet 800.

Further Example of a Porous Panel on an Engine Inlet

Figure 10:
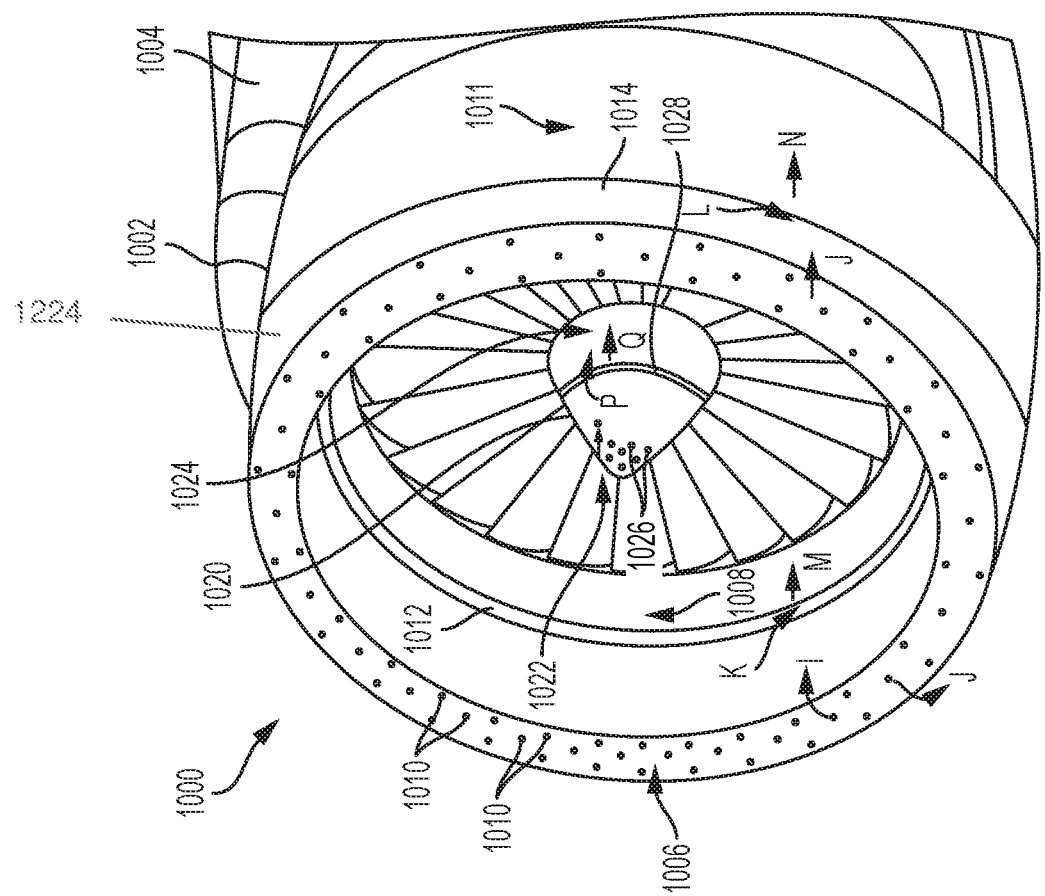
FIG. 10 is a front perspective view of a gas turbine engine and an engine nacelle with an anti-ice system according to various aspects.

FIG. 10 illustrates an anti-ice system according to various aspects on a gas turbine engine 1000. The gas turbine engine includes a nacelle 1002 mounted on a pylon 1004. The pylon 1004 could connect the nacelle 1002 to a wing or fuselage of an aircraft, for example. The nacelle 1002 includes a leading edge 1006. The leading edge 1006 includes a porous panel including a plurality of orifices 1010, through which an ice protection fluid can weep out. The ice protection fluid weeping out of the orifices 1010 can travel in the direction of arrow I toward an inward-facing downstream surface 1008 of the nacelle 1002 or in the direction of arrow J toward an outward-facing downstream surface 1011 of the nacelle 1002. The inward-facing downstream surface 1008 of the nacelle 802 includes an aperture 1012. The aperture 1012 could be arranged as a continuous aperture or as a series of spaced-apart apertures. Ice protection fluid traveling toward the aperture 1012 can be drawn into the aperture 1012 in the direction of arrow K and water carried by the ice protection fluid can continue into the engine in the direction of arrow M. The outward-facing downstream surface 1011 of the nacelle 1002 includes an aperture 1014. The aperture 1014 could be arranged as a continuous aperture or as a series of spaced-apart apertures. Ice protection fluid traveling toward the aperture 1014 can be drawn into the aperture 1014 in the direction of arrow L and water carried by the ice protection fluid can continue aft in the direction of arrow N.

A spinner 1020 for the gas turbine engine 1000 can also include an anti-ice system. An array of orifices 1026 for weeping the ice protection fluid onto the spinner, can be arranged on a first region 1022 (e.g., an upstream region) of the spinner 1020. An aperture 1028 can be arranged on a second region 1024 (e.g., a downstream region) of the spinner 1020. The aperture 1028 could be arranged as a continuous aperture or as a series of spaced-apart apertures. Ice protection fluid traveling from the orifices 1026 (in the direction of arrow O) toward the aperture 1028 can be drawn into the aperture 1028 in the direction of arrow P and water carried by the ice protection fluid can continue into the engine in the direction of arrow Q.

In one or more examples, the engines used with the ice protection system (including the sensor for the ice protection fluid) are smaller and more efficient, thereby enabling more efficient and lighter aircraft. One or more examples of the ice protection system enable the use of engines with very high bypass ratios and small cores because anti-ice bleed flow is reduced or eliminated.

Example of a Porous Panel on a Propeller or Jet Engine Fan

Figure 11:
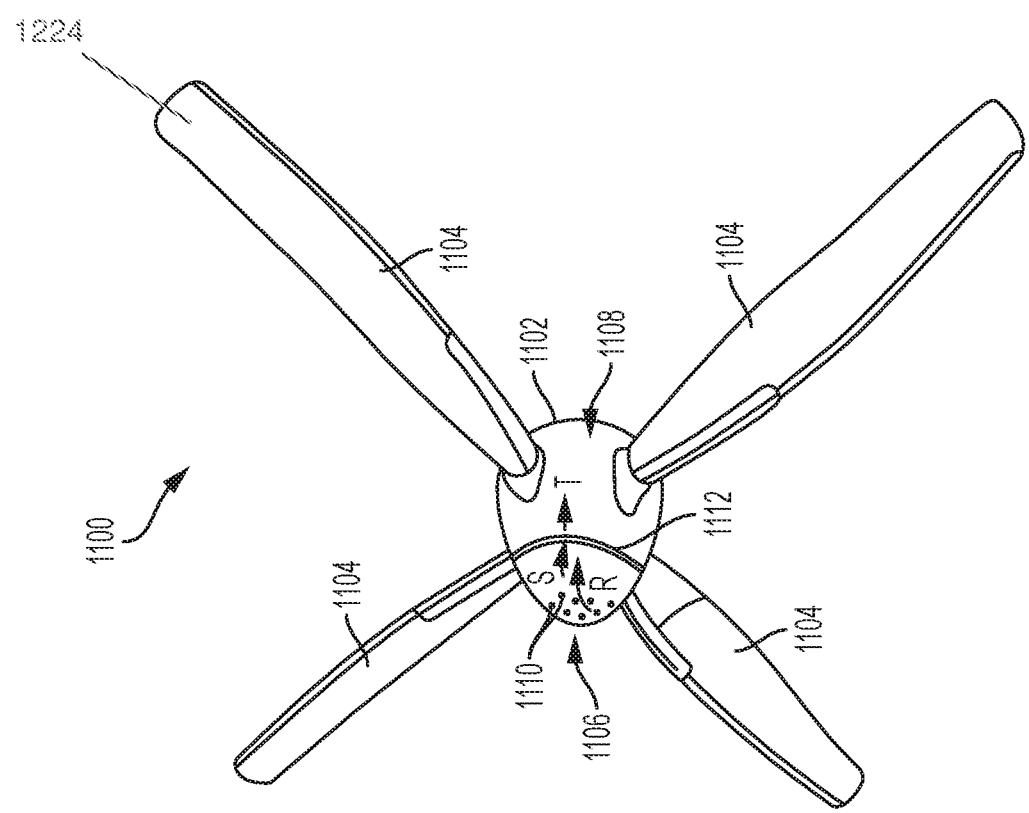
FIG. 11 is a front perspective view of a propeller and propeller spinner with an anti-ice system according to various examples.

FIG. 11 illustrates an anti-ice system according to various aspects on an aircraft propeller 1100. The propeller includes four propeller blades 1104 extending from a spinner 1102. An anti-ice system can be arranged for the spinner 1102. An array of orifices 1110, can be arranged on a first region 1106 (e.g., an upstream region) of the spinner 1102. An aperture 1112, similar to aperture 120 or aperture 122 shown in FIG. 1, can be arranged on a second region 1008 (e.g., a downstream region) of the spinner 1102. The aperture 1112 could be arranged as a continuous aperture or as a series of spaced-apart apertures. Ice protection fluid traveling from the orifices 1110 (in the direction of arrow R) toward the aperture 1112 can be drawn into the aperture 1112 in the direction of arrow S and water carried by the ice protection fluid can continue toward the blades 1104 the direction of arrow T.

In various examples, geared turbofan engines have fans that don't spin very fast. At some point they may spin slow enough that ice can form near the hub of the blade and an anti-ice system can be used to remove ice from the hub.

Figure 12:
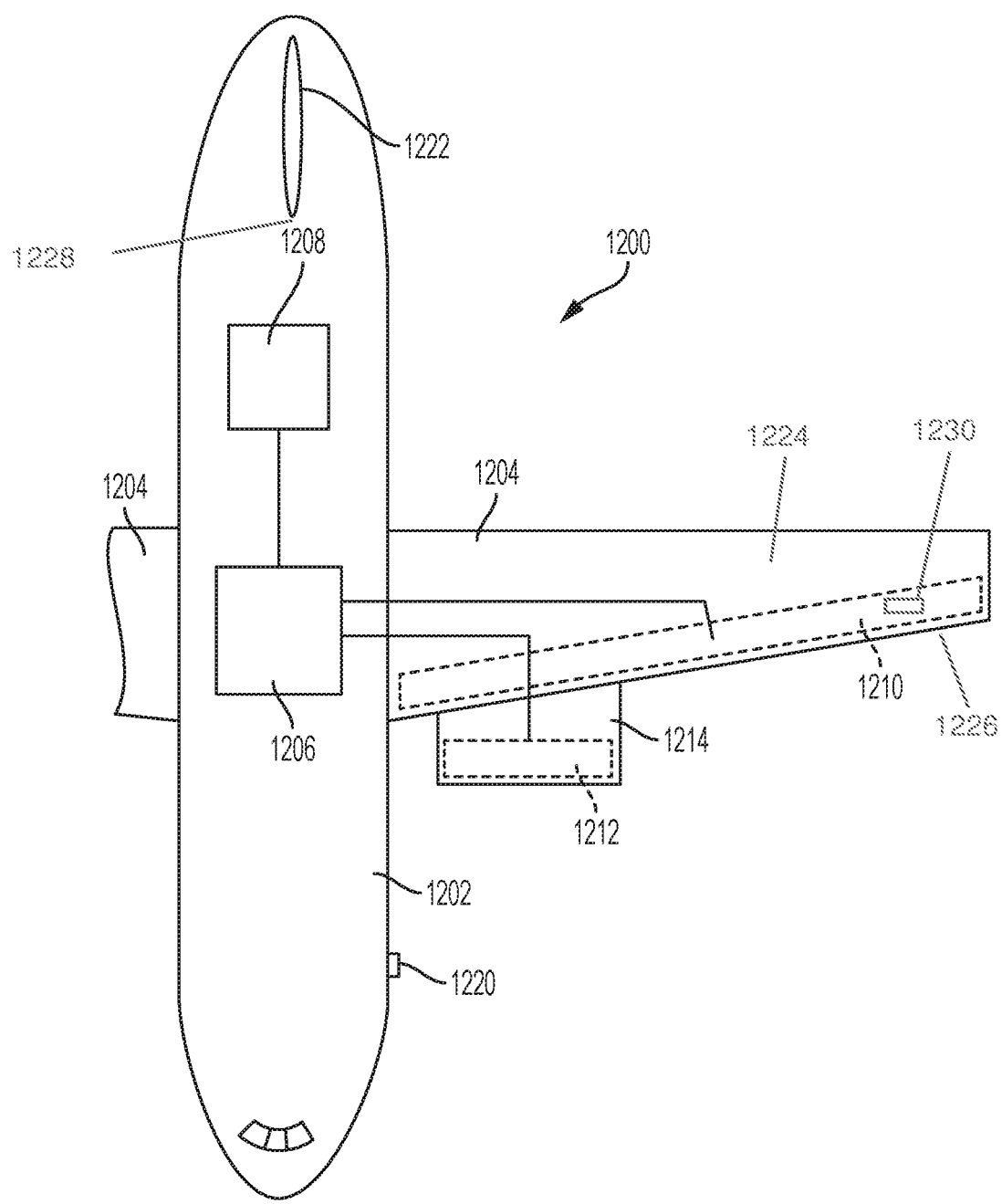
FIG. 12 is a top schematic view of an aircraft with an anti-ice system according to various examples.

FIG. 12 is a schematic view of an aircraft 1200, illustrating a portion of the fuselage 1202 and the wings 1204 of the aircraft 1200. The aircraft includes a reservoir 1206 of ice protection fluid and a computer or electrical system 1208. The ice protection fluid is provided to an anti-ice system 1210 (including a porous panel weeping ice protection fluid through orifices or pores) on the wings 1204 of the aircraft 1200 and to an anti-ice system 1212 on engines 1214 of the aircraft 1200. The anti-ice system 1210 on the wings 1204 could draw ice protection fluid from the reservoir 1006, pass the ice protection fluid through orifices in a leading edge of the wing, recover at least some of the ice protection fluid through apertures in a downstream region of the wing, and return the ice protection fluid to the reservoir 1206.

In various embodiments, the anti-ice reservoir is on the wing.

Also shown is ice detector 1220. The ice detector 1220 detects the buildup of ice on the aerodynamic surface. In various aspects, computer or electrical systems 1208 onboard the aircraft 1200 monitor the ice detector 1220 and automatically activate the anti-ice systems 1210 and 1212 if icing and/or icing conditions are detected.

In various aspects, the computer systems 1208 (including processors) are communicatively connected to the flow meter and valve controlling the flow of the engine bleed air into the tank, wherein the one or more processors use the flow rate of the ice protection fluid to control the flow rate of the engine bleed air through the valves such that the porous panels are charged with ice protection fluid after starting the engine. In various aspects, the one or more processors use the flow rate of the anti-ice fluid to control the flow rate of the engine bleed air such that the ice protection fluid flows out of the porous panels onto the aerodynamic surface, removing and preventing ice build-up on the aerodynamic surface.

Thus, FIPS can be used with porous panels on various parts of the aircraft, as illustrated in FIGS. 10-12. The tank 202 may be connected to various aircraft components, including, but not limited to, a wing 1204, a tail 1222, or an engine inlet 800.

Process Steps

Figure 13:
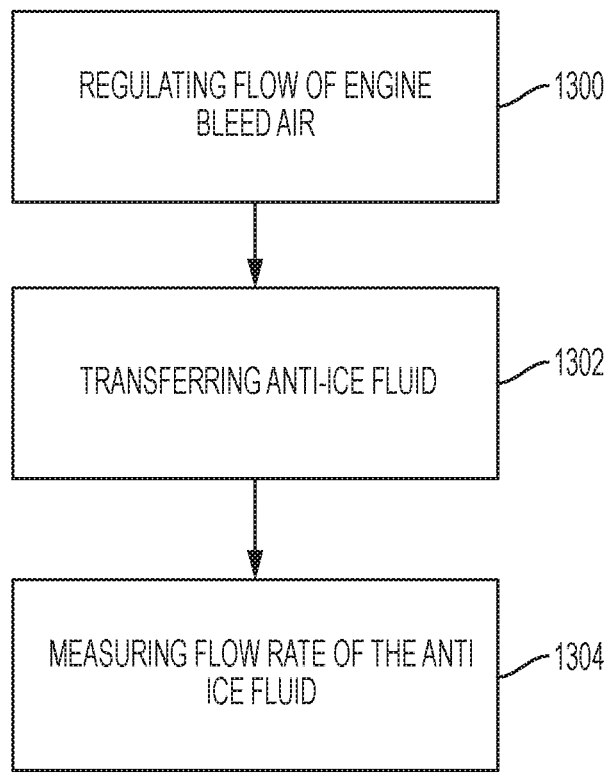
FIG. 13 is a flowchart illustrating a method of delivering anti-ice fluid according to various examples.

FIG. 13 is a flowchart illustrating a method of delivering anti-ice fluid 204, including pumping anti-ice fluid 204 between a porous panel 206 and a tank 202 using engine bleed air A, wherein the porous panel 206 is on an aerodynamic surface 1224 of an aircraft 1200. Examples of the aerodynamic surface 1224 include, but are not limited to, the leading edge 1006 of the turbofan engine 208, the leading edge 1226 of the wing 1204, or the leading edge 1228 of a tail 1222.

Block 1300 represents regulating the flow of engine bleed air A in an anti-ice system 1210, 1212.

In one example, the step includes pressurizing a tank 202 containing anti-ice fluid 204 using the engine bleed air A, forming a pressurized tank 202.

In another example, the regulating includes flowing engine bleed air A through the eductor 212, wherein the flowing creates a drop in pressure.

Block 1302 represents transferring the anti-ice fluid 204 under pressure from the engine bleed air A.

In one example, the transferring includes delivering the anti-ice fluid 204 from the tank 202 to the porous panel 206 under pressure from the engine bleed air A, wherein the anti-ice fluid 204 flows from the porous panel 206 to prevent and remove ice-build up 1230 on the aerodynamic surface 1224.

In various examples, the transferring includes varying a flow rate of the engine bleed air A into the tank 202 (and/or the pressure in the tank) to vary the flow rate of the anti-ice fluid 204 into the porous panel 206. In one example, the flow rate of the anti-ice fluid 204 charges the porous panel 206 with the anti-ice fluid 204 after starting the aircraft's engine 208. In various examples, panels 206 can be charged quickly (e.g., in less than 5 minutes). In another example, the flow rate of the anti-ice fluid 204 is controlled using the engine bleed air A so that the anti-ice fluid 204 flows out of pores 1010, 1026 in the porous panel 206 and onto the aerodynamic surface 1224, removing and preventing the ice build-up 1230 on the aerodynamic surface 1224.

In various examples, the flow rate of the engine bleed air A is varied using a pressure regulating valve such as a PRSOV or pneumatic valve. In various examples, flow rate is adjusted based on icing intensity measured by an ice detector 1220, such as, but not limited to, an accretion probe.

In various examples, the PRSOV pneumatic valves are a fluid driven valve, e.g., having a mean time before failure of at least 100,000 hours.

In various examples, the transferring includes using an eductor 212 to evacuate or vaccum out anti-ice fluid 204 from the porous panel 206 such that the anti-ice fluid's leakage from the porous panel 206 is eliminated or reduced. When the engine bleed air A flows through the eductor 212, the flowing creates a drop in pressure suctioning the anti-ice fluid 204 from the porous panel 206 and into a tank 202. For example, the eductor 212 pulls a vacuum on a tank 212 using the engine bleed air A and the vacuum draws the anti-ice fluid 204 into the tank 202 from the porous panel 206. In various examples, the porous panels 206 are evacuated prior to parking at the gate, reducing or eliminating leakage and the mess the leakage would otherwise cause.

In various examples, the transferring includes switching the flow of the engine bleed air A between the tank 202 and the eductor 212 using a first solenoid valve 222; regulating the flow rate of the anti-ice fluid 204 between the tank 202 and the eductor 212 using a second solenoid valve 224; and regulating the flow rate of the anti-ice fluid 204 between the tank 202 and the porous panel 206 using a third solenoid valve 228.

Block 1304 represents measuring the flow rate of the anti-ice fluid 204 between the tank 202 and the porous panel 206 using a positive displacement flow meter 218.

In various examples, one or more processors 1404A, 1404B are communicatively connected to the flow meter 218 and the PRSOV. The one or more processors 1404A, 1404B use the flow rate of the anti-ice fluid 204 to control the flow of the engine bleed air A through the PRSOV such that the porous panels 206 are charged with anti-ice fluid 204 after starting the engine 208. In further examples, the one or more processors 1404A, 1404B use the flow rate of the anti-ice fluid 204 to control the flow of the engine bleed air A such that the anti-ice fluid 204 flows out of the porous panels 206 onto the aerodynamic surface 1224, the anti-ice fluid 204 removing and preventing ice build-up 1230 on the aerodynamic surface 1224.

In various examples, all the FIPS components are installed under-cowl on the aircraft 1200 or inside the engine inlet lip 800.

In various examples, the use of engine bleed air A to transfer ice protection fluid 204 eliminates the need to use a DC pump with limited discrete flow rate capability. In various examples, the FIPS system described herein is capable of a much larger range of flow rate (e.g., flow rate variations with infinite levels of variation).

In various examples, the FIPS has a Built In Test (BIT). In various examples, the BIT comprises automatically operates the system routinely and creating a Pass/Fail criteria, and presenting the results of the Pass/Fail to the crew as a light on the dash and a maintenance message on the central maintenance computer 1000 (if present). In various examples, charging the panels is a BIT test.

Processing Environment

Figure 14:
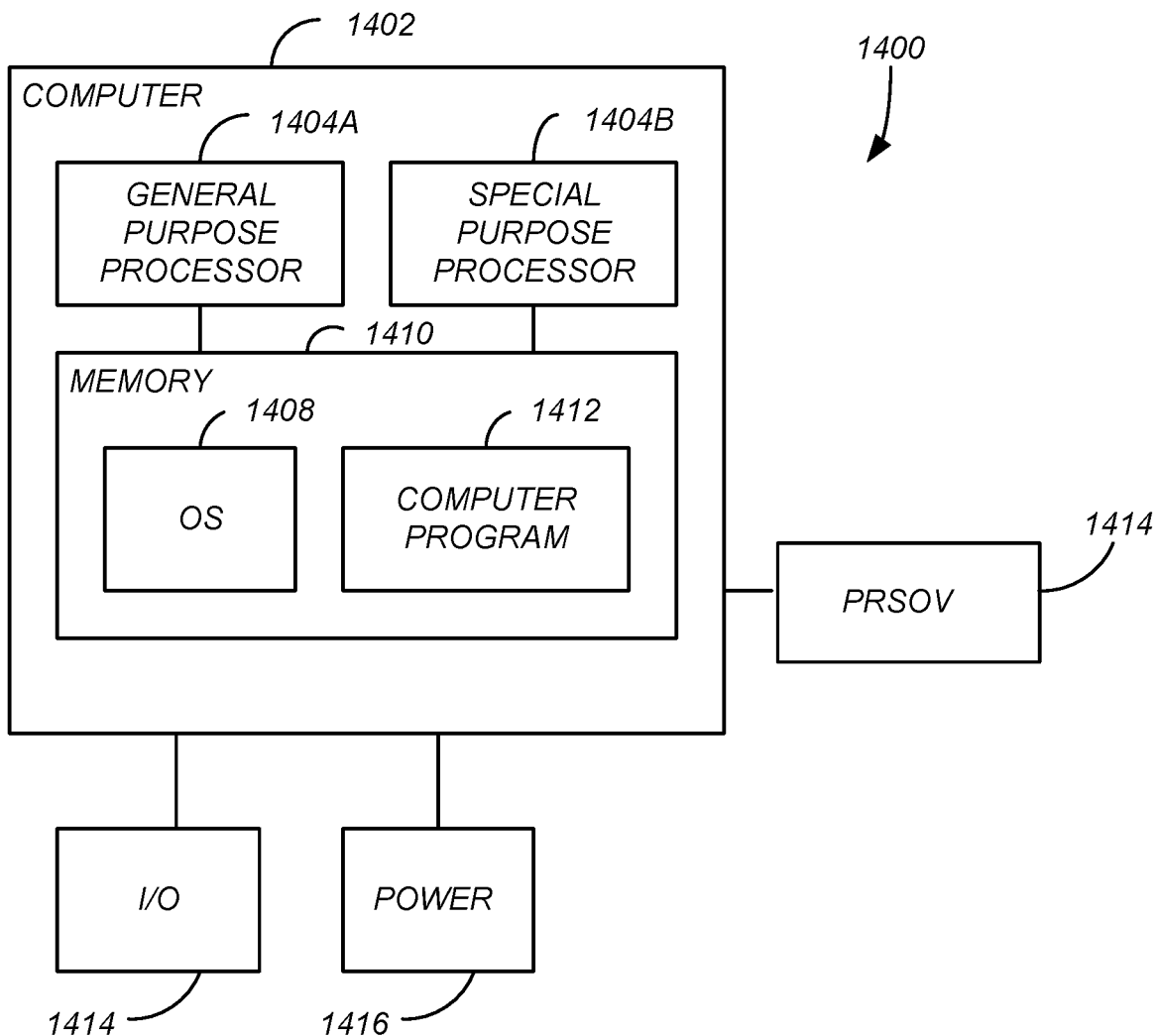
FIG. 14 is a processing environment used to control the FIPS according one or more examples.

FIG. 14 illustrates an exemplary system 1400 comprising a computer 1402 that could be used to implement processing elements needed to control the FIPS system (e.g., control engine bleed air flow A) or activate/deactivate the anti-ice system 1220. The computer 1402 is typically located on the aircraft.

The computer 1402 comprises a processor (comprising general purpose processor 1404A and special purpose processor 1404B) and a memory, such as random access memory (RAM) 1406. Generally, the computer 1402 operates under control of an operating system 1408 stored in the memory 1406, and interfaces with the user to accept inputs and commands (analog or digital signals) and to present results through an input/output module 1410. The computer program application 1412 accesses and manipulates data stored in the memory 1406 of the computer 1402. The operating system 1408 and the computer program 1412 are comprised of instructions which, when read and executed by the computer 1402, cause the computer 1402 to perform the operations herein described. In one embodiment, instructions implementing the operating system 1408 and the computer program 1410 are tangibly embodied in the memory 1406, thereby making a computer program product or article of manufacture. As such, the terms "article of manufacture," "program storage device" and "computer program product" as used herein are intended to encompass a computer program accessible from any computer readable device or media.

In one embodiment, computer 1402 comprises one or more field programmable gate arrays (FPGAs).

In one embodiment, the computer 1402 outputs a signal through I/O 1410 to the valve (PRSOV) controlling engine bleed air flow A or receives a signal through I/O 1410 from the flow meter 218. In response, the valve controls the engine bleed air flow A.

FIG. 14 further illustrates a power source 1416 for providing power to the system 1400.

Those skilled in the art will recognize many modifications may be made to this configuration without departing from the scope of the present disclosure. For example, those skilled in the art will recognize that any combination of the above components, or any number of different components, peripherals, and other devices, may be used.

FIPS Impact on Weight and Power Extraction, According to One or More Examples

In various examples, the FIPS offers a promising low-temperature, low-pressure anti-ice alternative which avoids the weight, complexity and power demands of a thermally-based system reliant on pneumatic or electrical heat transmission. Such a system decouples EAI from engine power extraction through either bleed or horse-power, and enables a decrease in core size for a MB engine. In various examples, the FIPS has power requirements reduced by orders of magnitude as compared to an anti-ice pneumatic swirl system as illustrated in FIG. 1.

In various examples, the FIPS system may enable ultra high bypass ratio engines having reduced engine core size and less thrust required when the FIPS is operating during descent over a pneumatic system.

Thus, this present disclosure describes unique methods for delivering ice protection fluid to ice prone surfaces on an aircraft, including, but not limited to, the leading edge of a turbofan engine. In various examples, the present disclosure solves issues with fluid leakage and could improve system reliability and operation.

The descriptions of the various aspects have been presented for purposes of illustration, but are not intended to be exhaustive or limited to the aspects disclosed. Many modifications and variations will be apparent to those of ordinary skill in the art without departing from the scope and spirit of the described aspects. The terminology used herein was chosen to best explain the principles of the aspects, the practical application or technical improvement over technologies found in the marketplace, or to enable others of ordinary skill in the art to understand the aspects disclosed herein.

While the foregoing is directed to aspects of the present invention, other and further aspects of the invention may be devised without departing from the basic scope thereof, and the scope thereof is determined by the claims that follow.

What is claimed is:

1. A method of removing an anti-ice fluid, comprising:
    extracting the anti-ice fluid from a porous panel into a tank under suctioning from an eductor when the eductor is connected to the tank and an engine bleed air flows through the eductor, wherein:
    the tank containing the anti-ice fluid is pressurized using the engine bleed air, and
    a conduit connected to the tank delivers the anti-ice fluid from the tank to the porous panel under pressure from the engine bleed air,
    the porous panel is on an aerodynamic surface of an aircraft, and
    the anti-ice fluid flows from the porous panel to prevent and remove ice-build up on the aerodynamic surface.

2. A system for removing and preventing ice build-up on an aerodynamic surface, comprising:
- a tank containing an anti-ice fluid and pressurized using an engine bleed air; and
- a conduit fluidly connecting to a porous panel on the aerodynamic surface of an aircraft, wherein the system is configured to deliver the anti-ice fluid under pressure from the tank to the porous panel and then exit the anti-ice fluid through the porous panel to prevent and remove the ice build-up on the aerodynamic surface.

3. The system of claim 2, further comprising:
- an eductor, wherein the eductor is configured to be connected to the tank to extract the anti-ice fluid from the porous panel into the tank under suctioning from the eductor when the engine bleed air flows through the eductor.

4. The system of claim 2, further comprising a valve configured to vary a flow rate of the engine bleed air into the tank so as to vary the flow rate of the anti-ice fluid into the porous panel.

5. The system of claim 4, wherein the valve configured to vary the flow rate of the engine bleed air is a pressure regulating shut off valve (PRSOV).

6. The system of claim 5, further comprising an eductor configured to vent the PRSOV's valve leakage.

7. The system of claim 4, wherein the flow rate of the anti-ice fluid is configured to charge the porous panel with the anti-ice fluid after starting an engine on an aircraft having the aerodynamic surface.

8. The system of claim 4, further comprising a computer configured to control the flow rate of the anti-ice fluid so that the anti-ice fluid:
- flows out of pores in the porous panel and onto the aerodynamic surface, and
- removes and prevents the ice build-up on the aerodynamic surface.

9. The system of claim 2, wherein:
- the tank is attached to an aircraft component;
- the porous panel is on the aerodynamic surface of the aircraft component; and
- the conduit:
- is configured to deliver the anti-ice fluid from the tank to the porous panel under a pressure from the engine bleed air when the tank is pressurized by the engine bleed air; and the system further comprising an eductor, wherein the eductor is connected to the tank and the engine such that the anti-ice fluid is extracted from the porous panel into the tank under suctioning from the eductor when the engine bleed air flows through the eductor.

10. The system of claim 9, further comprising:
- a first solenoid valve configured to switch a flow of the engine bleed air between the tank and the eductor;
- a second solenoid valve configured to regulate a flow rate of the anti-ice fluid between the tank and the eductor; and
- a third solenoid valve configured to regulate the flow rate of the anti-ice fluid between the tank and the porous panel.

11. The system of claim 10, further comprising a positive displacement flow meter for measuring the flow rate of the anti-ice fluid in the conduit.

12. The system of claim 11, further comprising one or more processors communicatively connected to the positive displacement flow meter and a pressure regulating shut off valve (PRSOV), wherein the one or more processors are configured to use the flow rate of the anti-ice fluid to control the flow of the engine bleed air through the PRSOV such that the porous panel is charged with anti-ice fluid after starting the engine.

13. The system of claim 12, wherein the one or more processors are further configured to use the flow rate of the anti-ice fluid to control the flow of the engine bleed air such that the anti-ice fluid flows out of the porous panel onto the aerodynamic surface, the anti-ice fluid removing and preventing the ice build-up on the aerodynamic surface.

14. The system of claim 9, wherein the aircraft component is a wing.

15. The system of claim 9, wherein the aircraft component is a tail.

16. The system of claim 9, wherein the aircraft component is an engine inlet.

17. A method of removing an anti-ice fluid, comprising:
- using an eductor to evacuate the anti-ice fluid into a tank from a porous panel such that a leakage of the anti-ice fluid from the porous panel is eliminated or reduced, wherein
- the tank containing the anti-ice fluid is pressurized using an engine bleed air,
- a conduit connected to the tank delivers the anti-ice fluid from the tank to the porous panel under a pressure from the engine bleed air,
- the porous panel is on an aerodynamic surface of an aircraft, and
- the anti-ice fluid flows from the porous panel to prevent and remove ice-build up on the aerodynamic surface.

18. The method of claim 17, wherein the eductor pulls a vacuum on the tank using the engine bleed air and the vacuum draws the anti-ice fluid into the tank from the porous panel.

19. The method of claim 17, further comprising:
- flowing the engine bleed air through the eductor, wherein the flowing creates a drop in the pressure suctioning the anti-ice fluid from the porous panel and into the tank.

20. The method of claim 17, further comprising measuring a flow rate of the anti-ice fluid, comprising:
- measuring a flow rate of anti-ice fluid using a positive displacement fluid meter, wherein the flow rate is between the tank and the porous panel delivering the anti-ice fluid to the aerodynamic surface of the aircraft.

* * * * *